United States Patent [19]

Witt et al.

[11] Patent Number: 4,910,431
[45] Date of Patent: Mar. 20, 1990

[54] HYDROGEN DISCHARGE ULTRAVIOLET LIGHT SOURCE OR LAMP, AND METHOD OF ITS MANUFACTURE

[75] Inventors: Jürgen Witt, Hainburg; Horst Kremmling, Limeshain; Werner Schwarz, Gelnhausen; Günter Thomas, Hanau; Helmut Lochmann, Hofheim, all of Fed. Rep. of Germany

[73] Assignee: W. C. Heraeus GmbH, Hanau, Fed. Rep. of Germany

[21] Appl. No.: 175,156

[22] Filed: Mar. 30, 1988

[30] Foreign Application Priority Data

Apr. 24, 1987 [DE] Fed. Rep. of Germany ....... 3713704
May 8, 1987 [DE] Fed. Rep. of Germany ....... 3715375

[51] Int. Cl.$^4$ ..................... H01J 17/48; H01J 17/16
[52] U.S. Cl. ................................. 313/589; 313/112; 313/117; 313/573; 313/635; 313/636; 313/637
[58] Field of Search ............... 313/589, 564, 635, 636, 313/112, 117, 637, 573; 250/509 R; 350/318, 319

[56] References Cited

U.S. PATENT DOCUMENTS

| | | | |
|---|---|---|---|
| 1,968,822 | 8/1934 | Gaidies et al. | 313/635 |
| 2,463,743 | 3/1949 | Cary et al. | 313/112 |
| 3,956,655 | 5/1976 | Pevo | 313/112 |
| 4,016,445 | 4/1977 | Cassidy et al. | 313/636 |
| 4,281,274 | 7/1981 | Bechard et al. | 315/49 |

FOREIGN PATENT DOCUMENTS

| | | |
|---|---|---|
| 513306 | 11/1930 | Fed. Rep. of Germany . |
| 636651 | 10/1936 | Fed. Rep. of Germany . |
| 1042115 | 10/1958 | Fed. Rep. of Germany . |
| 1489350 | 4/1969 | Fed. Rep. of Germany . |
| 2906038 | 8/1980 | Fed. Rep. of Germany . |
| 1522814 | 4/1968 | France . |
| 1486514 | 9/1977 | United Kingdom . |

OTHER PUBLICATIONS

Chemical Abstracts, vol. 71, 1969, S. 354, "Low Pressure Mercury Discharge Lamps", N. V. Philips, Abstract-Nr. 34526g.
Chemical Abstracts, Bd. 71, Nr. 5, 4 Aug. 1969.

*Primary Examiner*—Donald J. Yusko
*Assistant Examiner*—Michael Horabik
*Attorney, Agent, or Firm*—Frishauf, Holtz, Goodman & Woodward

[57] ABSTRACT

To protect the quartz of a quartz glass bulb (2) from attack by alkaline earth oxides emitted from electrodes (6) of the lamp, and prevent deterioration of the quartz in use of the lamp with respect to transmission of ultraviolet (UV) radiation, particularly in the short wave length range of 200 nm to 250 nm, boron silicate glass or glass-like aluminum oxide, or a mixture of boron silicate glass and glass-like aluminum oxide is interposed between the quartz bulb (2) and the electrodes. Boron oxide can be applied to the interior of the quartz bulb, and fired thereon to form, for example, a boron silicate glass layer (4) or diffuse into the quartz glass to form a diffusion layer (4') by suitable selection of firing temperatures. Alternatively, an aperture support element (35, 45) can retain a disk of boron silicate glass or glass-like aluminum oxide positioned between the electrodes and the quartz glass bulb. Such disk elements may be planar or of lensetic shape, positioned transverse to the radiation beam axis (10, 310) or at an angle thereto, to provide for partial transmission and reflection, for example in a dual-beam control or measuring system.

21 Claims, 4 Drawing Sheets

HYDROGEN DISCHARGE ULTRAVIOLET LIGHT SOURCE OR LAMP, AND METHOD OF ITS MANUFACTURE

BACKGROUND

Hydrogen discharge lamps, as referred to in the present application, are generally gas discharge lamps which are filled either with hydrogen or deuterium, or with a mixture of hydrogen and deuterium. A lamp of this type is described in U.S. Pat. No. 3,956,655, Pevo, the disclosure of which is hereby incorporated by reference.

Hydrogen discharge lamps lose radiation intensity during their lifetime, with respect to the initial radiation intensity available. Essentially, the loss in radiation emitted from the lamp is due to decrease of transmissivity of the bulb in which the electrodes and the fill are retained. The decrease in transmissivity is caused, primarily, by emitter material sputtered from the cathode, which may include barium, strontium, calcium and the like, which precipitates on the interior of the bulb. The material has a tendency to diffuse into the quartz glass and to react with the quartz. This interferes with the high transmissivity of pure quartz glass with respect to UV radiation, and particularly in the ranges of wave length below 250 nm. The radiation output thus decreases markedly over the lifetime of the lamp.

The lifetime of such a lamp is usually referred to as that time during which it can be operated, until the intensity of received radiation has dropped by about 50% or more, with respect to the initial radiation intensity. At a wave length of 230 nm, lamps with customary cathode construction then will have a lifetime of about 750 hours.

The referenced U.S. Pat. No. 3,956,655 describes a lamp having a fill of hydrogen or deuterium at low pressure. Rather than using quartz, the bulb is made of a boron silicate glass, e.g. of the Corning Type 9741 glass (tradename of Corning Glassworks). This increases the lifetime by about a factor of two in the wave length under question. The increased lifetime is believed to be due to the higher resistance of boron silicate glass with respect to alkaline earths than is the case with quartz glass. The lower inherent transmissivity regarding UV radiation with respect to quartz glass is compensated by utilizing a thinner wall. Thinning the walls of the bulb is obtained by fine drawing or tubular blowing of the bulb. This requires additional handling and, due to the reduction of wall thicknesses to only about 0.3 mm, renders the resulting bulb fragile and more subject to breakage.

THE INVENTION

It is an object to provide a discharge lamp which has a bulb of quartz glass and in which the transmissivity to radiation in the region of less than 300 nm is reduced only by a small value, such as by less than 15%, and preferably less than 10%.

The lamp, basically of standard construction, has electrodes therein and a fill which includes hydrogen or deuterium, or a mixture of hydrogen and deuterium. The electrodes may include emitter material of an alkaline earth oxide, or an alkaline earth mixture. In accordance with the invention, an element having a surface region of borosilicate glass or a glass-like aluminum oxide or a mixture of borosilicate and a glass-like aluminum oxide, is positioned in the path of emission of radiation along a radiation beam axis between the electrodes and the lamp bulb of quartz glass. The surface region of the borosilicate glass or glass-like aluminum oxide or mixture of glass and oxide faces the electrodes.

In accordance with a feature of the invention, the element forms a portion of the quartz glass bulb, and the surface itself is borosilicate glass formed as a region on the inner surface of the bulb facing the electrodes.

In accordance with another feature of the invention, the element is located in an aperture defining a radiation path and surrounding the radiation axis, with the surface of borosilicate glass or glass-aluminum oxide or a mixture thereof facing the electrodes.

In a preferred form, a layer of borosilicate glass is applied to the quartz glass bulb in the region facing the discharge between the electrodes, that is, at the inside of the bulb.

In accordance with a preferred feature of the invention, the inner side of the quartz bulb, and facing the discharge, has boron oxide diffused therein to a depth of about 10 micrometers.

In accordance with a feature of the invention, a hydrogen lamp with boron oxide diffused in the bulb can be made by providing the quartz bulb, applying a suspension thereon which includes at least boron oxide, drying the suspension, and firing the layer after drying, so that the surface facing the discharge region, when electrodes are inserted in the bulb, will glaze, forming a boron silicate glass. The firing temperature, preferably, is selected to be so high that during the firing the boron silicate will glaze, and form a glass layer or coating or diffusion in the quartz.

Rather than diffusing the boron silicate within the outer bulb, it is also possible to introduce an element of boron silicate glass in the path of radiation; in accordance with a preferred feature of the invention, an aperture, for example in form of a fixed diaphragm, is located within the housing, and retained within the lamp housing by suitable support elements. The clear opening of the aperture is somewhat larger than the radiation emission window of the housing. An element of boron silicate glass and/or glass-like aluminum oxide, or a mixture of boron silicate glass and glass-like aluminum oxide, is then placed into or adjacent the aperture so that emission of radiation along the radiation beam axis must pass through the element before meeting the quartz bulb, thereby shielding the quartz material of the quartz bulb from attack by material emitted from the electrodes.

Placing an element of boron silicate glass or glass-like aluminum oxide, or a mixture of boron silicate glass and glass-like aluminum oxide, in advance of the quartz bulb has the advantage that the quartz bulb may have normal wall thickness and thus have normal strength; yet, it provides for substantially higher transmission radiation in wave lengths below 300 nm, and specifically below 250 nm, and is suitable also for very short wave lengths in the range of 200 nm or less. The present invention can be used with lamps having bulbs made of synthetic quartz, which permits transmission of radiation for wave lengths below 200 nm.

Lamps with quartz glass bulbs can be used in regions of high ambient temperatures, and higher temperatures than lamps which do not have quartz glass at the outer bulbs; thus, they can be used directly in systems exposed to exhaust gases, test systems, within smoke stacks, or the like.

The structure utilizing an aperture is particularly applicable when the nature of bulb materials is to be specially selected. For high radiation intensity, the thickness of the element around the aperture or the size of the aperture can be suitable selected, and other elements can be used in combination therewith, for example filters or the like which have special transmission characteristics so that the spectrum of the emitted radiation can be suitably selected. Of course, placing filters in the path of radiation can also be used with bulbs in which boron silicate is directly glazed on the bulb, with the filter interposed between the radiation source and the bulb.

DRAWINGS, ILLUSTRATING AN EXAMPLE

DETAILED DESCRIPTION

Figure 1A:
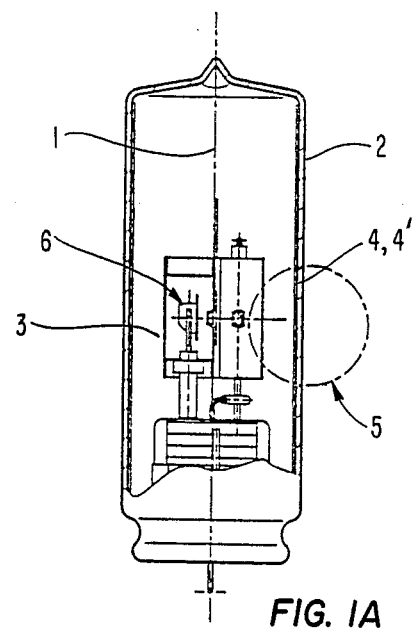
FIG. 1A is a schematic longitudinal view through a lamp in accordance with the present invention.
Figure 1B:
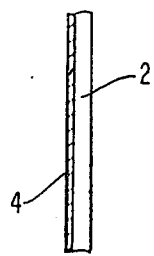
FIG. 1B is a fragmentary longitudinal view illustrating the layers of the bulb wall at the level of, at least approximately, the electrodes.
Figure 1C:
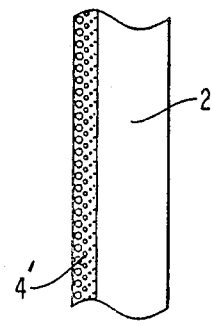
FIG. 1C is a highly enlarged schematic longitudinal section through the wall of the bulb, illustrating diffused boron silicate glass in a quartz bulb.

Referring first to FIGS. 1A-1C;

A cylindrical lamp bulb 2 of quartz glass defines a central axis 1. An electrode system, not shown in detail and of standard construction, includes an anode and a cathode and a housing or holder structure 3 therefor. The electrodes 6 can be constructed, for example, as described in the referenced U.S. Pat. No. 3,956,655, and, as such, does not form the subject matter of the present invention. The electrodes preferably are coiled, and in order to obtain high radiation intensity, an aperture surrounded by highly heat-resistant material, that is, material having a high melting point, is located in the housing. A suitable material is molybdenum. The dispersion angle of the radiation beam may be in the range of from about 30° to 40°.

In accordance with a feature of the present invention, a layer 4 of boron silicate glass is fused to the inside of the bulb 2 made of quartz glass. The thickness of the layer 4 is between about 50 nanometers and 10 micrometers. For better visibility, the layer 4 is shown in FIG. 1A by broken lines although, of course, the thickness of the layer cannot be graphically reproduced in the drawing. FIGS. 1B and 1C show the region of the wall of the bulb 2 within the circle 5, shown in chain-dotted line.

FIG. 1B is a general longitudinal view through the wall of the lamp in the level of the electrode system. For better illustration, the layer 4 has been shown hatched and the layer 2 which, of course, is transparent, has been left blank.

METHOD OF APPLICATION

The inner surface of the bulb 2 can be coated by immersing the bulb 2 in a solution containing boron, such as boric acid. It is also possible to apply boron oxide by cathodic atomization or by thermal vapor deposition to apply boron oxide to the inside of the lamp bulb.

After applying boron oxide, either by slushing a suspension within the bulb 2, and draining, by dip-immersion, cathodic atomization or otherwise applying a boron oxide suspension, the bulb with the boron oxide thereon is dried and then subjected to a firing process which, preferably, is carried out at such a temperature that the surface of the quartz glass layer is glazed, such that a boron silicate glass will form on the surface.

It is not necessary to completely coat the inside of the bulb 2 with the boron silicate; it is only necessary that the region in which the boron silicate 4 will appear is located in that zone where the beam from the electrodes 3 is emitted, that is, within the dispersion angle of the beam and, preferably, slightly thereover. Thus, the inside of the bulb 2 can be masked or boron oxide partially sprayed; it is also possible to apply a suspension, for example by painting or brushing on only in the region which will be subjected to radiation from the electrode system, so that only that part of the lamp bulb will have the layer of the present invention applied thereto which has radiation passing therethrough. This, however, requires precise adjustment of the bulb with respect to the electrodes in the direction of beam emission.

FIG. 1C illustrates a modification in which a boron silicate surface 4' is located at the inside of the bulb 2 which, however, does not form a separate discrete layer, as shown by layer 4 in FIG. 1B. Rather, the quartz glass of the bulb and the boron silicate glass applied thereto form a continuous structure. The inside of the boron silicate glass will form a glaze surface, the boron silicate being diffused within the quart glass 2. For better visualization, and merely as a schematic illustration in the drawing, the boron silicate layer 4' is shown by open circles which decrease in size as the silicate diffuses into the quartz glass 2. The small circles or points are to be considered merely symbolic.

The structure of FIG. 1C can be made similarly to the method previously discussed, by applying a boron oxide suspension at the inside of the bulb which first is dried. It is then fired by a flame. This forms a boron silicate glass surface. The very thin layer of the boron silicate glass surface does not interfere with the overall transmissivity of the quartz glass. The boron silicate glass surface, however, renders the inside of the bulb chemically resistant with respect to alkaline earths which may precipitate or deposit on or attack the bulb during operation of the lamp derived, typically, from the electrodes. The decrease in transmission over the lifetime of the lamp thus is effectively prevented and the lifetime of the lamp is enhanced.

Figure 2:
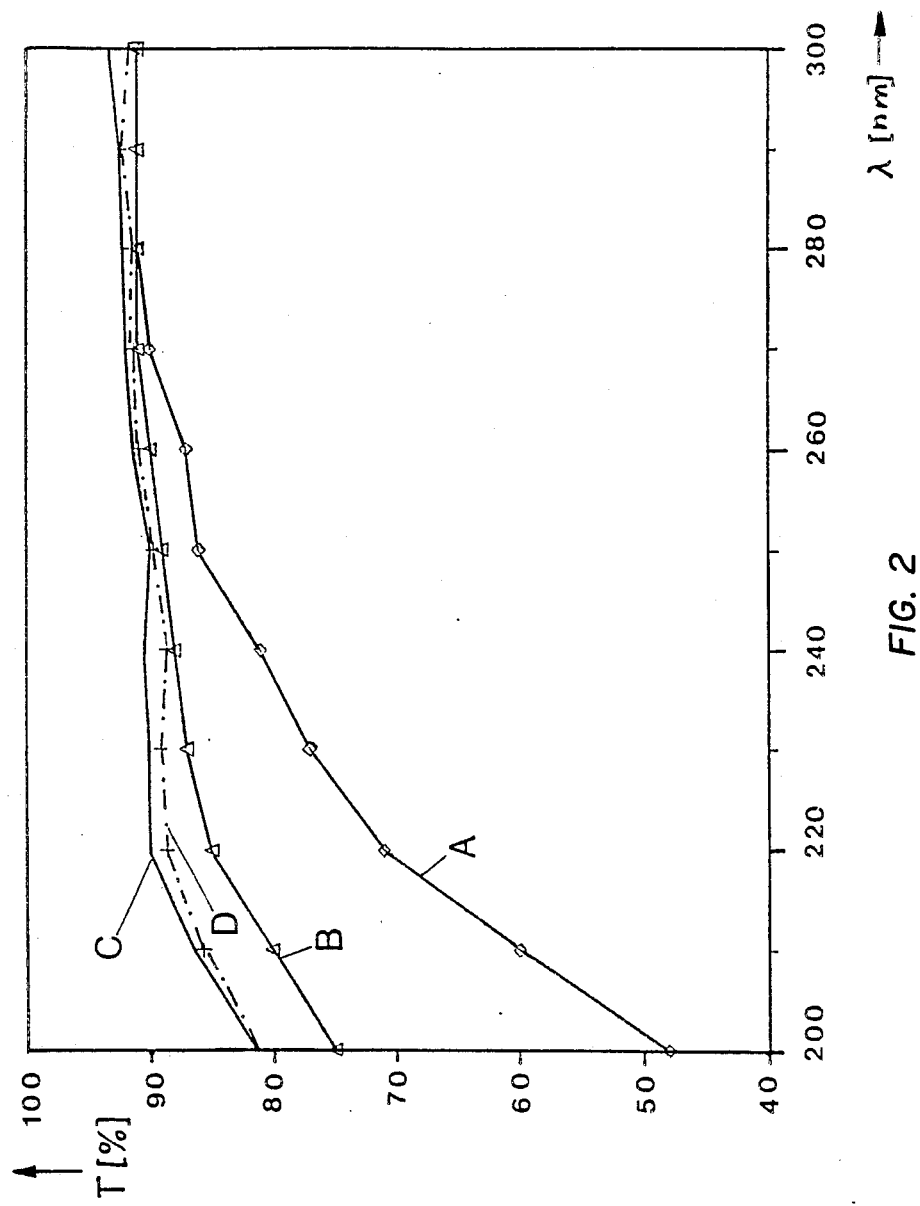
FIG. 2 illustrates a radiation transmission diagram of the lamp of FIG. 1A.

FIG. 2 is a graphic illustration of spectral transmission in percent for various bulb materials in the ultraviolet range of from 200 nm to 300 nm wave length.

Curve A illustrates transmission with boron silicate glass of 1 mm thickness. As can be seen, transmission at 200 nm is somewhat under 50%; transmissivity increases with rising wave length, and in the region of about 250 nm, about 85% transmission can be obtained.

Curve B illustrates the transmission of boron silicate glass having a wall thickness of 0.3 mm. Due to the substantially decreased thickness, the transmission is substantially improved and at 200 nm wave length, a transmissivity of 74% can be obtained already. The rise in transmissivity, with increasing wave length, is not as steep as that of curve A and improves only to a lesser extent. The transmissivity at a wave length of 250 nm is about 88%.

Curve C illustrates transmissivity of quartz glass of 1 mm thickness. This curve clearly shows that the transmissivity at a wave length of 200 nm is already 82%; at a wave length 250 nm, the transmissivity is at about 90%. The difference in transmissivity between curves A and C, for equal wall thicknesses, thus is marked.

Curve D illustrates the transmissivity for a bulb made in accordance with the structure of FIG. 1C, in which boron oxide is diffused at the inside of the bulb, and in which the quartz glass bulb has a wall thickness of 1 mm, that is comparable to the wall thickness of curve C. It can easily be seen that the absorption with respect to pure quartz glass is very low, and that the transmissivity with respect to UV radiation is almost as good as that of pure quartz glass. The transmissivity of curve D, in the wave length between 200 to 260 nm, is substantially above the values of boron silicate glass of the same wall thickness, represented by curve A, and is also substantially better than that of curve B, with much thinner glass. The transmissivity values of the curve D, in accordance with the present invention, differs from the transmissivity of curve C, of pure quartz glass, and which is subject to deterioration over age, by only about 2%.

In regions of the wave length of from 270 to 300 nm, the absorption effect decreases, and as the wave length increases further, becomes negligible. Transmissivity loss then is based practically only on reflections at the interfaces of the bulb.

the boron oxide diffused into the quartz glass, as shown schematically in FIG. 1C, is diffused for a depth of about 10 micrometers. The diffused layer throughout the diffusion depth may contain less than 25% boron oxide with, of course, the majority of boron oxide content being at the surface. Thus, the boron silicate glass formed in the structure of FIG. 1C may contain only about 25% boron oxide as such.

Figure 3:
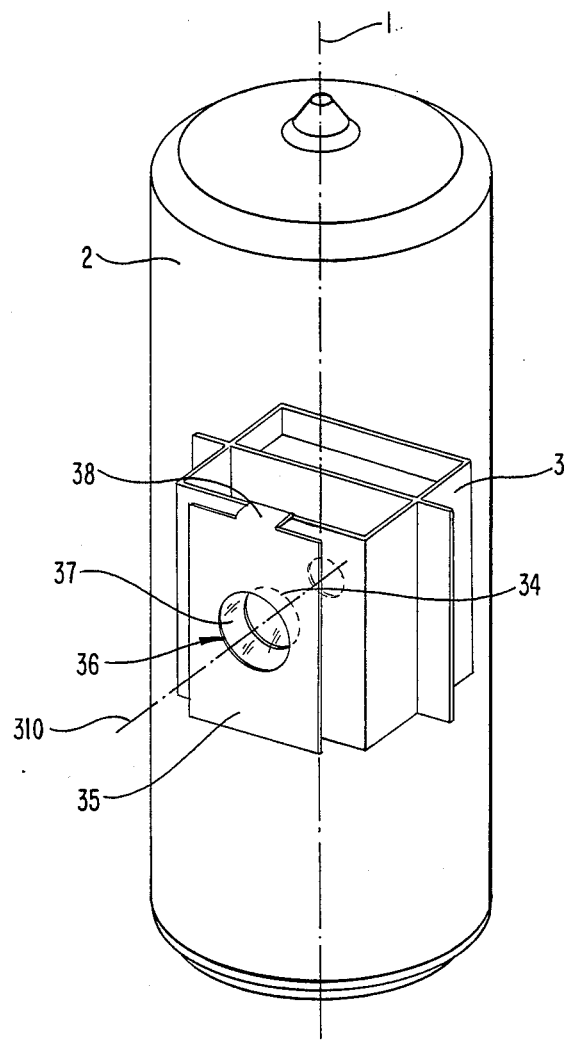
FIG. 3 is a perspective view through another embodiment of a lamp incorporating the present invention, in which a separate shielding element is located in the radiation path.
Figure 4:
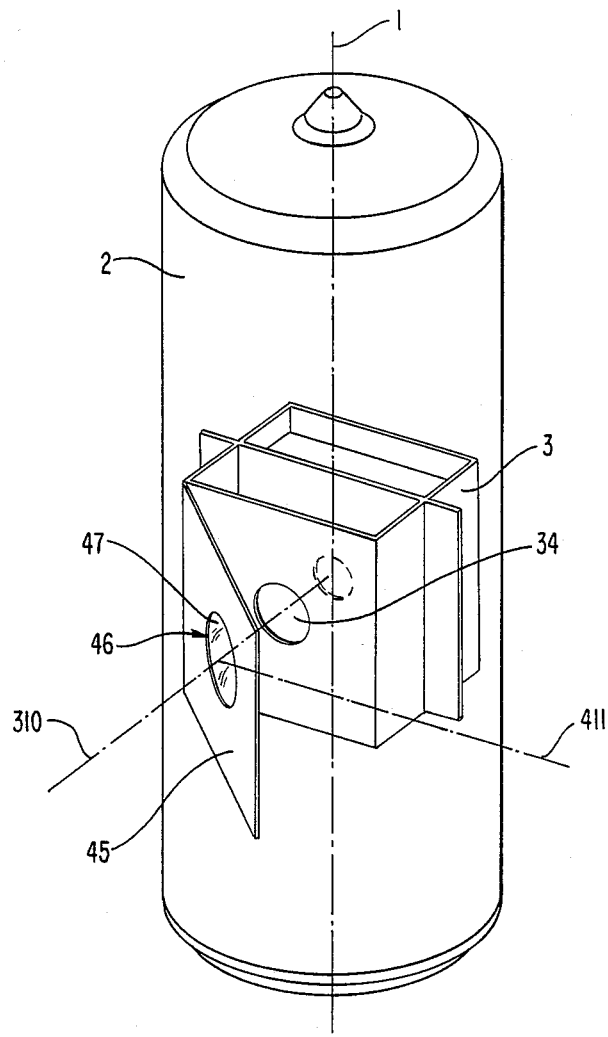
FIG. 4 illustrates, generally, the lamp of FIG. 3, and a modification of placement of a shielding element in the path of radiation from the lamp.

It is not necessary that the lamp bulb is shielded against the effect of alkaline earth materials emitted from the electrodes throughout its entire surface and, as described, the interior of the bulb can be masked. FIGS. 3 and 4 illustrate another embodiment in which, rather than applying the boron silicate directly on the inside of the bulb, an aperture-diaphragm combination can be used to retain a boron silicate glass structure.

Referring to FIG. 3: The bulb 2, defining the axis 1, and within which an electrode housing 3 is located, is shown in isometric representation. The housing 3, again made of molybdenum, is formed with an aperture 34 to form a radiation emission window. The radiation is emitted with a dispersion angle of about 30° to 40°, and essentially symmetrical with respect to a central radiation emission axis 310.

In accordance with this embodiment of the invention, an apertured diaphragm holder 35 is located ahead, in the direction of radiation emission, of the window 34. The diaphragm holder 35 is formed with an opening 36 therein in which a filter element 37 is located. The frame of the diaphragm holder 35 is secured to the housing 3 by spacer straps or bracket elements 38 to provide for mechanical retention thereof on the housing 3. The radiation emission axis 310 is central to the opening 36 and the filter 37.

Figure 3A:
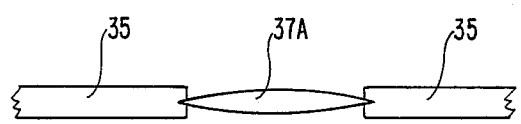
FIG. 3A is a fragmentary cross-sectional view of a lensatic element.

The filter 37 is formed as a thin disk of boron silicate glass, having a thickness of, for example, between 0.08 mm and 1 mm, and preferably, about 0.14 mm. This thin filter element 37 only slightly interferes with radiation transmission of UV radiation. The filter 37, however, prevents transmission of evaporated emitter material to the inside of the quartz bulb in the region of the emission of radiation. This prevents reaction between the quartz of the quartz glass and the alkaline earths, which might reduce the optical transmissivity in the short-wave UV radiation, as explained in connection with FIG. 2. The boron silicate glass itself, as known, is resistant against alkaline earth attack. Thus, the overall UV radiation during operation of the lamp is effectively unimpaired, thus substantially increasing the lifetime of the lamp.

the filter element 37 can be a planar filter or, alternatively, it may be shaped in form of a lens 37A, FIG. 3A, to provide for focussing of the radiation emitted from the electrode system (not shown) within the housing 3. Thus, focussing along the radiation axis 310 can be obtained simultaneously with preventing attack of the quartz bulb 2 by electrode material.

FIG. 4 illustrates another embodiment of the general structure of FIG. 3, in which the plane of the diaphragm holder 45 is placed at an angle, for example of about 45°, with respect to the radiation axis 310. This increases the area of the diaphragm 45 subject to deposition of emitter material by a factor of about 1.4, so that reduction of transparency per unit area is less than when the angle between the plane of the boron silicate glass element 47 and the axis of emitted radiation is 90°. On the other hand, however, due to the angular positioning of the diaphragm 45, and hence of the boron silicate glass flat or lensatic element 47, a portion of the radiation is reflected as illustrated, schematically, by beam 411. The element 47 is inserted in opening 46.

The elements 37, 37A, 47 may also be made of glass-like aluminum oxide, or a mixture of boron silicate glass and glass-like aluminum oxide. Since the function is to prevent deposition of emitted alkaline earth material on the quartz glass envelope, no filter substance need be applied in the path of the reflected beam 411, since emitted material would not be deflected in the path shown schematically by the broken line 411.

The reflected radiation as shown schematically by the path 411, may be used, for example, as a reference beam in a measuring system, as is customary in dual-beam photo meters. The beam 411 may also be used as a control beam to control the radiation intensity by measuring the reflected beam, and then control supply energy to the electrodes 6 (FIG. 1A) of the lamp, in accordance with a well known control system. The arrangement of FIG. 4, thus, provides in one element 47 for shielding the quartz bulb 2 of the lamp from attack from alkaline earths from the electrodes while, at the same time, providing for beam splitting, for example for control or reference purposes.

The element 47 forms an optical element. A side of the optical element 47 also may have a reflective surface and it is, thus, possible to couple an external light beam, for example of different wave length, into the beam path of the discharge lamp, so that the spectral range of the light beam 310, as well as the beam 41 can be increased, or the intensity within a predetermined spectral range can be increased. By focussing a beam, for example, through the transparent bulb 2 on the optical element 47, 180° from the beam 411, a portion will pass through the element 47 along the beam schematically shown at 411, and the portion will be reflected along the beam path 310, thereby superimposing additional radiation externally applied on the beam from the electrodes within the housing 3.

The radiation transmissive region of the diaphragm-optical element 37 or 47, respectively, may be flat or planar, and the diaphragm element 35, 45 can be shaped differently than shown. The opening within the diaphragm holder 35, 45 can be enlarged, so that the angle of emitted radiation can be increased, for example to cover a range of between 30° to 55°. The element 37, 47 need not be entirely of boron silicate glass or of glass-like aluminum oxide, or a mixture thereof with boron silicate glass; a composite or diffused structure as shown in FIG. 1C, in which boron silicate is diffused into quartz glass, or on which boron silicate is layered over quartz glass as shown in FIG. 1B, may also be used for the elements 37, 37A, 47 of FIGS. 3 and 4. Preferably, the boron oxide diffused in such an element should have a diffusion depth of at least 1 micrometer. The diaphragm support 35, 45 preferably has a material thickness of from between 0.08 to about 1 mm. The element 47 can be planar or lensatic. FIG. 3A illustrates a lensatic element 37A inserted in the diaphragm support 35; the element 47 can be similar or have other lens form, as desired.

Various changes and modifications may be made and features described in any one of the embodiments may be used with any of the others within the scope of the inventive concept.

We claim:

1. A hydrogen-type discharge lamp having
a lamp bulb (2) of quartz glass defining a bulb axis (1);
electrodes (6) located in said bulb, at least one of the electrodes including an emitter material comprising an alkaline earth oxide or an alkaline earth oxide mixture;
electrode retention means (3) for retaining the electrodes in said bulb, and formed with a radiation emission window (4) for emission of radiation along a radiation beam axis (10, 310);
a fill including hydrogen, or deuterium, or a mixture of hydrogen and deuterium retained within said bulb (2),
and comprising,
means for preventing attack on the quartz glass of the lamp bulb by alkaline earth oxides emitted from said at least one electrode in operation of the lamp and for preventing reduction of transmissivity of ultraviolet radiation through said quartz glass, comprising
an element (4, 4', 37, 37A, 47) having a surface region of borosilicate glass or a glass-like aluminum oxide or a mixture of borosilicate glass and a glass-like aluminum oxide, with a surface region thickness of between about 50 nanometers and 10 micrometers positioned in the path of emission of radiation along said radiation beam axis between said electrodes 96) and said lamp bulb (2) of quartz glass, with said surface region facing the electrodes.

2. The lamp of claim 1, wherein the emitter material of the at least one electrode comprises a mixture of at least two of barium oxide, calcium oxide and strontium oxide.

3. The lamp of claim 2, wherein said at least one electrode comprises a cathode.

4. The lamp of claim 1, wherein said element comprises a portion of the quartz glass bulb (2) and said surface comprises boron silicate glass forming a region of the inner surface of said bulb and facing the electrode 96).

5. The lamp of claim 1, wherein said element comprises a layer of boron silicate glass (4) in the interior of the bulb (2).

6. The lamp of claim 1, wherein said element comprises boron oxide diffused within the quartz glass bulb (2).

7. The lamp of claim 6 wherein the diffusion depth is between about 1 to 10 micrometers.

8. The lamp of claim 6, wherein the boron oxide content of the diffused layer is less than 25%.

9. The lamp of claim 1, wherein said element comprises boron oxide located over essentially the entire inner walls of the lamp bulb (2).

10. A hydrogen-type discharge lamp having
a lamp bulb (2) of quartz glass defining a bulb axis (1);
electrodes (6) located in said bulb, at least one of the electrodes including an emitter material comprising an alkaline earth oxide or an alkaline earth oxide mixture;
electrode retention means (3) for retaining the electrodes in said bulb, and formed with a radiation emission window (4) for emission of radiation along a radiation beam axis (10, 310);
a fill including hydrogen, or deuterium, or a mixture of hydrogen and deuterium retained within said bulb (2),
and further comprising
means for preventing attack on the quartz glass of the lamp bulb by alkaline earth oxides emitted from said at least one electrode in operation of the lamp and for preventing reduction of transmissivity of ultraviolet radiation through said quartz glass including
an element (4, 4', 37, 37A, 47) having a surface region of borosilicate glass or a glass-like aluminum oxide or a mixture of borosilicate glass and a glass-like aluminum oxide, positioned in the path of emission of radiation along said radiation beam axis between said electrodes 96) and said lamp bulb (2) of quartz glass, with said surface region facing the electrodes;
an aperture structure (35, 45) positioned inside the bulb (2) and formed with means permitting passage of emitted radiation along said radiation beam axis (310);
and wherein said element comprises a boron silicate glass or a glass-like aluminum oxide essentially disk-like part (37) retained in said structure, and located within said radiation passage means, and including said surface region facing the electrodes (6).

11. The lamp of claim 10, wherein said structure comprises a diaphragm structure (35) of essentially planar form and at least of the size of said radiation emission window.

12. The lamp of claim 11, including holding straps or brackets (38) holding the aperture structure (35) on the electrode retention means.

13. The lamp of claim 11, wherein the aperture structure forms an angle with said beam axis (310) of between about 35° to 55°, preferably 45%.

14. The lamp of claim 10, wherein said essentially disk-like part comprises a disk-like element of boron silicate glass.

15. The lamp of claim 10, wherein said essentially disk-like part comprises an element of quartz glass having a layer of boron oxide diffused therein, said layer facing the electrodes.

16. The lamp of claim 10, wherein said essentially disk-like part comprises a disk element having two plane-parallel surfaces.

17. The lamp of claim 16, wherein the plane-parallel surfaces form an angle with respect to said radiation beam axis (310).

18. The lamp of claim 16, wherein said disk-like part has a thickness of between about 0.08 to 1 mm.

19. The lamp of claim 16, wherein said disk-like part includes a reflective surface formed over at least a portion of said part facing the electrode.

20. The lamp of claim 10, wherein said disk-like part has lensatic shape (37A).

21. The lamp of claim 10, further including a diaphragm or aperture means (35, 45) formed with an opening or aperture 936, 46);
   and wherein said element comprises an insert disk-like element located in said opening and having a surface facing the electrodes including boron silicate glass or a glass-like aluminum oxide or a mixture of boron silicate glass and a glass-like aluminum oxide.

* * * * *